United States Patent Office 3,269,811
Patented August 30, 1966

3,269,811
CHEMICAL COMPOSITION AND GASOLINE CONTAINING SAME
John H. Udelhofen, Calumet City, Ill., assignor to Standard Oil Company, Chicago, Ill., a corporation of Indiana
No Drawing. Original application Apr. 28, 1961, Ser. No. 106,195. Divided and this application May 22, 1963, Ser. No. 287,456
3 Claims. (Cl. 44—63)

This is a division of application Serial No. 106,195, now abandoned, filed April 28, 1961, and entitled "Chemical Composition and Gasoline Containing Same."

This invention relates to a chemical composition useful as a corrosion inhibitor in hydrocarbon fuels. This invention further relates to hydrocarbon fuel compositions containing new and useful corrosion inhibitors.

The chemical compositions of this invention are salts of 1,2-disubstituted imidazoline and succinamic acid. The salts correspond to the structural formula:

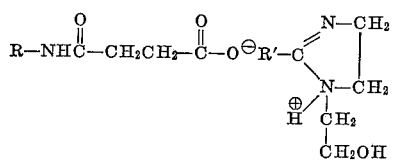

In the formula, R and R' each represent an open-chain hydrocarbon radical of 8 to 20 carbon atoms. The hydrocarbon radicals may be a saturated or unsaturated aliphatic radical, having either a straight or branched chain.

The salts may conveniently be prepared by reacting equimolar amounts of the 1,2-disubstituted imidazoline and succinamic acid. The reaction proceeds readily at room temperature but the reactants may be heated and agitated if desired to increase the reaction rate. The reaction is complete when heat of reaction ceases to be evolved. The reaction is a neutralization reaction with resulting salt formation; such reactions and their conditions, as well as useable catalysts, are well known to the art.

The succinamic acid and 1,2-disubstituted imidazoline used in the above reaction may be purchased or may be prepared by methods known in the art. The 1,2-disubstituted imidazolines may be prepared by reaction of the corresponding carboxylic acid (R'COOH) with N-hydroxyethyl ethylene diamine until two moles of water are split out; this occurs upon closure of the imidazoline ring. The succinamic acid may be prepared by reaction of equimolar amounts of an amine ($RNH_2$) with succinic acid under known conditions to form the amido linkage with the resulting splitting out of one mole of water.

Illustrative examples of succinamic acid salts of 1,2-disubstituted imidazolines are 1-(2-hydroxyethyl)-2-heptadecenyl imidazolinium N-tallow succinamate,
1-(2-hydroxyethyl)-2-(2,4-dimethyl hexyl) imidazolinium N-eicosyl succinamate,
1-(2-hydroxyethyl)-2-palmityl imidazolinium N-caprylyl succinamate,
1-(2-hydroxyethyl)-2-lauryl imidazolinium N-lauryl succinamate,
1-(2-hydroxyethyl)-2-n-octyl imidazolinium N-n-octyl succinamate,
1-(2-hydroxyethyl)-2-n-decenyl imidazolinium N-tallow succinamate,
1-(2-hydroxyethyl)-2-linolenyl imidazolinium N-stearyl succinamate,
1-(2-hydroxyethyl)-2-stearyl imidazolinium N-octadecadienyl succinamate,
1-(2-hydroxyethyl)-2-nonyl imidazolinium N-capryl succinamate,
1-(2-hydroxyethyl)-2-coco imidazolinium N-coco succinamate,
1-(2-hydroxyethyl)-2-eicosyl imidazolinium N-eicosyl succinamate,
1-(2-hydroxyethyl)-2-myristyl imidazolinium N-oleyl succinamate,
1-(2-hydroxyethyl)-2-monohydroxystearyl imidazolinium N-decyl succinamate,
1-(2-hydroxyethyl)-2-linoleyl imidazolinium N-decyl succinamate,
1-(2-hydroxyethyl)-2-soybean imidazolinium N-tallow succinamate,
1-(2-hydroxyethyl)-2-tallow imidazolinium N-tallow succinamate,
1-(2-hydroxyethyl)-2-(3-ethyl hexyl) imidazolinium N-oxooctyl succinamate, and
1-(2-hydroxyethyl)-2-tallow imidazolinium N-coco succinamate.

The terms "coco," "soybean" and "tallow" as used herein designate that the defined group was derived from coco fatty acids, soybean fatty acids and hydrogenated tallow fatty acids. Such fatty acids and the corresponding amines which are derived therefrom are well known to the art. For example, hydrogenated tallow acid predominates in stearic acid and contains a substantial amount of palmitic acid and very small amounts of myristic and oleic acids. Coco fatty acid (distilled) contains about 50% lauric acid and the remainder of the acids range from $C_8$ to $C_{18}$, including caprylic, capric, myristic, palmitic, stearic, oleic and linoleic acids. Soybean fatty acids include mixtures of saturated and unsaturated acids in the $C_{16-18}$ range.

EXAMPLE OF PREPARATION OF A SALT OF 1,2-DISUBSTITUTED IMIDAZOLINE AND SUCCINAMIC ACID

As an example of the preparation of a salt of this invention, equimolar amounts of N-tallow succinamic acid and 1-(2-hydroxyethyl)-2-heptadecenyl imidazoline were mixed in isopropyl alcohol solvent with stirring while heating above room temperature for 30 minutes. The isopropyl alcohol solvent was then evaporated from the resulting product. The product was 1-(2-hydroxyethyl)-2-heptadecenyl imidazolinium N-tallow succinamate.

The above-defined salts are useful as corrosion inhibitors in corrosion inhibiting amounts in hydrocarbon fuels, e.g., in amounts of from about 0.0001 to about 0.1 weight percent and preferably in amounts of from about 0.0003 to about 0.0015 weight percent. Concentrates of the salts in hydrocarbon fuels or other suitable solvent, such as xylene, toluene, benzene, phenol, isopropyl alcohol, ethanol, n-butanol, etc., are also intended. Such concentrates may contain the salt in an amount greater than normally used in hydrocarbon fuels as set out above, for example in an amount in the range of 10 to 70% by weight in a suitable solvent. The primary function of the R and R' groups in the above formula is to impart oil-solubility to the chemical compounds for use in hydrocarbon fuels as additives and the particular number of carbon atoms in the R and R' groups is not critical. Other addition agents such as anti-knock agents, anti-ice agents, antioxidants, pre-ignition suppressors, dyes, etc. may also be added to the hydrocarbon fuel composition or additive concentrate when desired. The salts of this invention, in addition to being effective corrosion inhibitors, are also effective rust inhibitors.

The corrosion inhibitors of this invention are effective in both the hydrocarbon and aqueous phases encountered in the handling and storage of fuels. Hydrocarbon phases are present as the fuel itself and the aqueous phases are produced by condensation and in some cases by contamination through seepage or from processing of the fuel. Also present in the fuel in many instances are acidic and/or caustic substances in small amounts resulting from prior treatment of the fuel or a component thereof, e.g., from acid treating and/or caustic treating. Such acidic and/or caustic materials are corrosive toward metal parts such as storage tanks, valves, pipelines, tank cars, burners, etc. Other corrosive substances may be formed through oxidative deterioration of the fuel in the presence of oxygen, particularly if the fuel is stored for substantial periods of time or stored or transported under adversely high temperature conditions. The corrosive materials become distributed throughout both the hydrocarbon and aqueous phases and it becomes desirable, if not necessary, to protect against corrosion of metal parts from both phases. The salts of this invention are useful in giving such protection from corrosion in both phases.

EXAMPLES OF CORROSION INHIBITED HYDROCARBON FUELS

As an example of a corrosion inhibited gasoline, Sample A was prepared as identified below. For comparative purposes, Samples B and C were also prepared.

Sample A—A premium grade blended gasoline containing 3 ccs. TEL and 0.0003 weight percent 1-(2-hydroxyethyl)-2-heptadecenyl imidazolinium N-tallow succinamate.

Sample B—A premium grade blended gasoline containing 3 ccs. TEL and 0.0003 weight percent N-tallow succinamic acid.

Sample C—A premium grade blended gasoline containing 3 ccs. TEL and 0.0003 weight percent 1-(2-hydroxyethyl)-2-heptadecenyl imidazoline.

Sample D—A premium grade blended gasoline containing 3 ccs. TEL and 0.0016 weight percent of a commercial rust and corrosion inhibitor.

The above Samples A–D were subjected to the following corrosion test procedure: Each sample was placed with an equal volume of an aqueous phase in a test tube and stirred briefly to permit the corrosion inhibiting agent to be distributed between the two phases. Stirring was then discontinued. An S-shaped steel test strip, having an electrical terminal at each end of the S was immersed in the oil phase to reach adsorption equilibrium and the electrical resistance was noted as a control resistance value. The steel test strip was then lowered into the aqueous phase and after 24 hours the change in electrical resistance was taken as a measure of corrosion during the 24-hour period. The amount of corrosion was then compared with the amount of corrosion obtained in a control run without the inhibitor. Results are reported in Table I in terms of percent reduction in corrosion compared with the control run. One hundred percent reduction is equivalent to absence of measurable corrosion. The aqueous phases used consisted of water containing the amounts of corrosive substances listed in Table I below.

TABLE I.—Percent reduction in corrosion

| Sample | Aqueous Phase Containing: | | | | |
|---|---|---|---|---|---|
| | 0.1% NaCl | 0.2% NaCl | 0.5% NaCl | 1% NaCl | 0.1% NaCl plus 10⁻⁴ M NaOH |
| A | Percent 98 | Percent 90 | Percent 90 | Percent 90.5 | Percent 98.2 |
| B | 86.2 | 27.6 | 43.5 | 22.5 | 58.4 |
| C | 36.2 | 30 | 25 | 21.5 | 39 |
| D | 96 | 63 | 45 | 24 | 66 |

The results reported in Table I demonstrate the superiority of the salts of this invention as corrosion inhibitors in comparison with each of two reactants which may be used to form the salts. In all cases, the salts gave at least about 90% reduction in corrosion.

In order to comparatively test the corrosion inhibitor of this invention, an additional sample of light petroleum fuel (Sample E) was prepared in accordance herewith. Sample F was also prepared for purposes of comparison.

Sample E—A heater oil fraction containing 0.0003 weight percent 1-(2-hydroxyethyl)-2-heptadecenyl imidazolinium N-tallow succinamate.

Sample F—A heater oil fraction containing 0.0003 weight percent tallow ammonium N-tallow succinamate

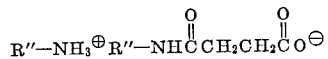

wherein R'' is a tallow group.

The above Samples E and F were subjected to the corrosion test in accordance with the procedure set out above using 0.1% NaCl plus 10⁻⁴ M NaOH in the aqueous phase. The results were as follows:

Table II

| Sample: | Percent reduction in corrosion rate |
|---|---|
| E | 100 |
| F | 17 |

The above data of Table II illustrate the superiority of the corrosion inhibitor of the present invention over a related inhibitor of a structure not in accordance with the compositions of this invention. The one hundred percent reduction in corrosion rate demonstrates perfect corrosion inhibition under the test conditions.

Although gasoline and heater oil were specifically used in the above examples, the present corrosion inhibitors are useful in any normally liquid hydrocarbon fuel. For example, the hydrocarbon fuel may be a jet, diesel or other internal combustion engine fuel, a burner fuel or other heater or furnace fuel, or the like. More specifically, the fuel or fuel oil may be a diesel fuel, a gasoline, a jet fuel, a heavy industrial residual fuel (e.g. bunker C,) a furnace oil, a heater oil fraction, kerosene, a gas oil, etc. The fuel may be a cracked or virgin distillate or mixture thereof. Residual oils are also useable. Advantageously the fuel may boil in the range of about 200 to 750° F. e.g., a distillate fuel oil cut boiling in the 350 to 650° F. range. Other fuels useable will be readily recognized by those skilled in the art from the above descriptions.

It is evident that I have provided new and useful corrosion inhibitors and hydrocarbon fuels containing the same.

I claim:
1. A fuel composition comprising a major amount of a liquid hydrocarbon fuel and an amount sufficient to inhibit corrosion of a salt of 1,2-disubstituted imidazo- line and succinamic acid, said salt corresponding to the structural formula:

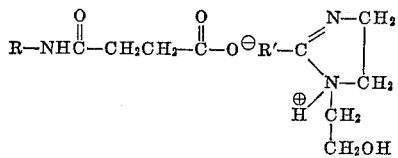

wherein R and R' are each open chain hydrocarbon radicals of 8 to 20 carbon atoms.

2. The fuel composition of claim 1 wherein said amount of said salt is from 0.0001 to 0.1 weight percent.

3. The fuel composition of claim 1 wherein said hydrocarbon fuel boils in the gasoline distillation range.

References Cited by the Examiner

UNITED STATES PATENTS

| | | | |
|---|---|---|---|
| 2,773,879 | 12/1956 | Sterlin | 44—63 |
| 2,907,646 | 10/1959 | O'Kelly et al. | 44—63 |
| 2,919,979 | 1/1960 | Martin et al. | 44—63 |
| 2,944,969 | 7/1960 | Stromberg et al. | 252—392 |
| 3,060,007 | 10/1962 | Freedman | 44—63 |

FOREIGN PATENTS 832,038  4/1960  Great Britain.

DANIEL E. WYMAN, *Primary Examiner.*

Y. M. HARRIS, *Assistant Examiner.*